G. MACLOSKIE.
CAR CONTROLLER.
APPLICATION FILED AUG. 28, 1918.
1,298,528.
Patented Mar. 25, 1919.
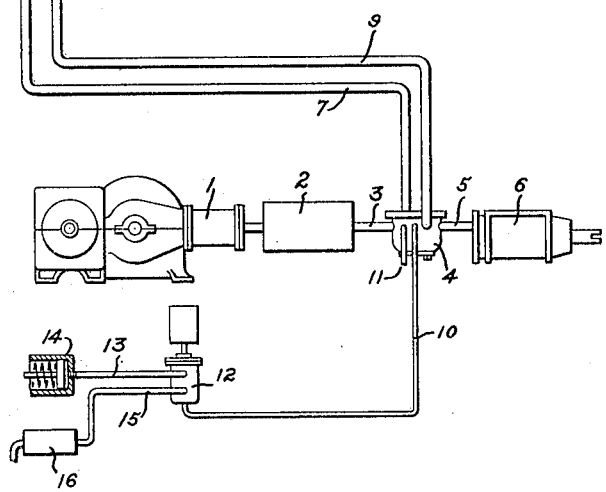
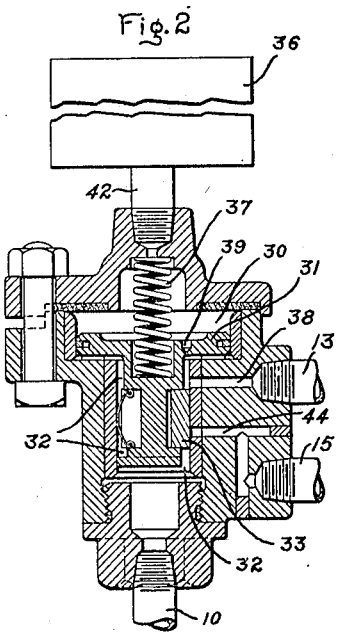
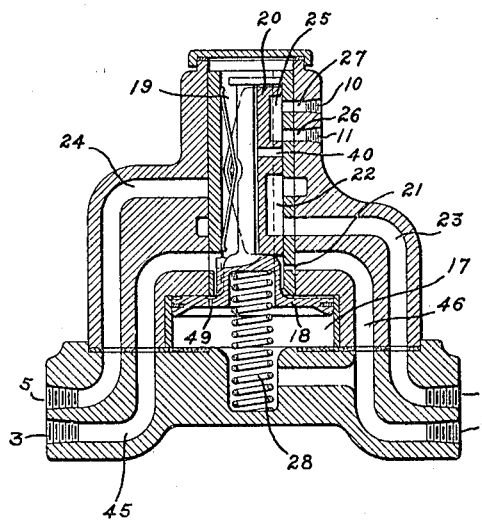
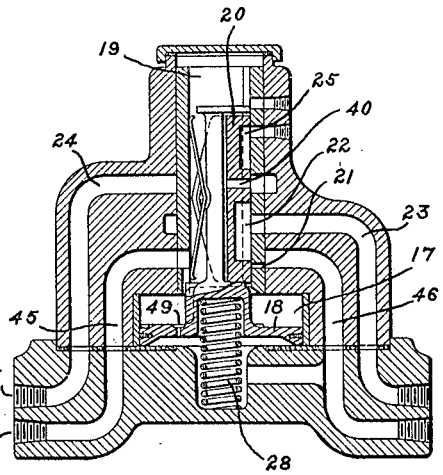
Inventor:
George Macloskie,
by
His Attorney.

UNITED STATES PATENT OFFICE.

GEORGE MACLOSKIE, OF ERIE, PENNSYLVANIA, ASSIGNOR TO GENERAL ELECTRIC COMPANY, A CORPORATION OF NEW YORK.

CAR-CONTROLLER.

1,298,528.

Specification of Letters Patent.

Patented Mar. 25, 1919.

Application filed August 28, 1918. Serial No. 251,824.

*To all whom it may concern:*

Be it known that I, GEORGE MACLOSKIE, a citizen of the United States, residing at Erie, in the county of Erie, State of Pennsylvania, have invented certain new and useful Improvements in Car-Controllers, of which the following is a specification.

This invention relates to fluid pressure brakes and more particularly to apparatus for controlling the stopping of a car and the opening of the doors of the car by means of fluid pressure.

It is very desirable to stop a car as quickly as possible when an emergency application of the brakes is made and also to open the doors of the car as soon as it has stopped.

The principal object of this invention is to provide means which is actuated when an emergency application of the brakes is made, to first operate a sanding mechanism for a predetermined length of time to apply sand to the tracks, and then at the end of said interval, to operate a door opening device.

In the accompanying drawings, Figure 1 is a diagrammatic view of a car brake equipment embodying my invention; Fig. 2 is a sectional view of the timing valve used in this system; Fig. 3 is a diagrammatic sectional view of the emergency valve used in this system, showing the parts in normal position, and Fig. 4 is a view similar to Fig. 3, showing the parts in emergency position.

Fig. 1 shows a main reservoir 2 supplied with air by any convenient source, as a compressor 1. The reservoir 2 is connected to a passage 45 in the emergency valve 4 by a pipe 3. The passage 45 communicates with the valve chamber 19, and through a restricted opening 21 in the valve seat of the emergency valve, with a passage 46, the latter being connected to the emergency line 7 and to the piston chamber 17. A train line 9 is connected to a passage 23, the latter being connected through a cavity 22 in the valve 20 to the passage 24 which is connected to the brake cylinder 6 by a pipe 5. The train line 9 and the emergency line 7 are connected together by an engineer's valve 8. The piston 18 is normally kept in its elevated position, shown in Fig. 3, by a compression spring 28. An exhaust pipe 11 is connected to a passage 26, the latter being normally connected through a cavity 25 in the slide valve 20 to a passage 27 which is connected to a valve chamber 32 in the timing valve 12 by a pipe 10. The valve chamber 32 communicates with a piston chamber 30 of the timing valve through a restricted passage 39 in the piston 31. The piston chamber 30 communicates with the timing reservoir 36 through a pipe 42. The valve chamber 32 communicates through a passage 38 in the timing valve with a pipe 13, the latter being connected to a door operating mechanism 14. The valve chamber 32 is also arranged to communicate through a passage 44 in the timing valve with a pipe 15, the latter being connected to a sanding mechanism 16. The piston 31 is normally kept in the position shown in Fig. 2 by a compression spring 37.

In the lap or running position of the engineer's valve 8 fluid under pressure is supplied from reservoir 2 through pipe 3, passage 45, valve chamber 19, restricted opening 21, passage 46 to the emergency line 7 and to the piston chamber 17. It is obvious that the fluid pressure on both sides of the piston 19 is the same and, therefore, the piston is held in the position shown in Fig. 3 by the pressure exerted by the spring 28.

A straight air application of the brakes is made by turning the handle of the engineer's valve 8 to service position. The emergency line 7 is thereby connected through a restricted cavity in the engineer's valve in the train line 9, in a well known manner, and fluid under pressure is supplied through the train line 9, passage 23, cavity 22, passage 24, brake pipe 5 to the brake cylinder 6. The fluid pressure still remains the same on both sides of the piston 18 and, therefore, a straight air application of the brakes does not operate the piston 18 and the slide valve 20.

The brakes are released after a straight air application by turning the handle of the engineer's valve 8 to release position. The train line 9 is thereby connected to the exhaust pipe 43 through a cavity in the engineer's valve to exhaust the fluid from the brake cylinder 6.

In order to make an emergency application of the brakes by means of the engineer's valve, the handle of the engineer's valve is moved to emergency position. As is well known, the emergency line 7 is connected to the train line 9 through a large cavity in the engineer's valve and both are connected to exhaust through a restricted passage in the engineer's valve. Fluid then flows from the piston chamber 17 of the emergency valve 4 much more rapidly than it can flow into the piston chamber through the restricted port 21. The pressure in the piston chamber 17 is thereby reduced and the fluid pressure against the top of the piston 18 overcomes the pressure exerted by the compression spring 28 and moves the piston 18 and slide valve 20 to the position shown in Fig. 4 of the drawing. Since the emergency line 7 is connected to exhaust, the pressure in the piston chamber 17 cannot be increased to the reservoir pressure and, therefore, the emergency valve 4 remains in its operated position as long as the handle of the engineer's valve is held in emergency position.

In this position of the emergency valve 4, a port 40 in the slide valve 20, which communicates with the valve chamber 19, registers with the passage 24 so that fluid under pressure is supplied directly from the valve chamber 19, through the port 40, passage 24, pipe 5, to the brake cylinder 6, thereby quickly building up the pressure in the brake cylinder. The passage 27 is also uncovered by the movement of the slide valve 20 so that fluid under pressure is supplied from the valve chamber 19 through the passage 27 and the pipe 10 to the valve chamber 32 of the timing valve 12. This pressure in the chamber 32 moves the piston 31 against the compression spring 37.

While the slide valve 33 is in its operated position, the passage 44 is uncovered and fluid under pressure is supplied from the pipe 10, through the valve chamber 32, passage 44, pipe 15 to the sanding mechanism 16. The sanding mechanism may be of any well known construction, which is arranged, when fluid under pressure is supplied thereto, to apply sand to the tracks. The fluid under pressure also flows from the valve chamber 32, through the restricted passage 39, piston chamber 30, pipe 42 to the timing reservoir 36.

The slide valve 20 of the emergency valve 4, in its operated position, closes the restricted opening 21 but fluid under pressure is still supplied to the passage 46 and the emergency line 7 through a restricted passage 49 in the piston 18, but the emergency line 7 is not recharged to the main reservoir pressure because it is connected to exhaust through the above mentioned passage in the engineer's valve.

After the timing valve 12 has been in its operated position for a certain period of time, sufficient fluid will have passed into the timing reservoir to increase the pressure therein so that the spring 37 will move the slide valve 33 back to its normal position. This movement of the slide valve 33 covers the passage 44 in the valve seat, thereby cutting off the supply of fluid under pressure to the sanding mechanism 16. This movement of the slide valve 33 also uncovers the passage 38 and fluid under pressure is supplied through the passage 38, pipe 13, to the door opening mechanism 14 to open the doors of the car. It is obvious, therefore, that sand is applied to the tracks for a predetermined period of time, at the end of which the doors of the car are opened. The arrangement is designed as nearly as possible to open the doors at the time the train comes to a stop.

The brakes are released after an emergency application by moving the handle of the engineer's valve to release position. This causes the emergency line 7 to be recharged to the main reservoir pressure whereupon the emergency valve 4 returns to its normal position and the brakes are released in a well known manner.

When the emergency valve returns to its normal position, the pipe 10 is connected to the exhaust pipe 11 to exhaust the fluid from the timing valve and permit it to move back to its normal position.

When an automatic emergency application of the brakes is made, as for example, by the train breaking in two, the sudden drop in the pressure below the piston 18 of the emergency valve 4 permits the reservoir pressure on the upper side of the piston to depress the piston in the same way as when an emergency application of the brakes is made by means of the engineer's valve 8. With the emergency valve in its operated position, the timing valve is operated in the same manner as above described to apply sand to tracks and to open the doors.

The brakes are released after an emergency application by repairing the break in the emergency pipe. Fluid under pressure then flows from the main reservoir pipe 3, through the valve chamber 19, restricted passage 49 in the piston 18, piston chamber 17, to the emergency line 7, thereby charging the piston chamber 17 to the main reservoir pressure, and allowing the compression spring 28 to return the piston 18 and slide valve 20 to the normal position. The pipe 10 is then connected to the exhaust pipe 11 to release the fluid from the timing valve 12 and the door opening mechanism 14.

It is to be understood that there is other equipment on the train for applying sand for opening and closing the doors of the train by the fluid pressure. However, as such equipment is well known and does not constitute a part of this invention, it is deemed unnecessary to disclose it.

It is evident that when an emergency application of the brakes is made, the emergency valve automatically effects the operation of a sanding mechanism to apply sand to the tracks for a predetermined length of time to stop the train as quickly as possible and then automatically effects the opening of the doors so that the passengers may readily get out of the car, if necessary.

What I claim as new and desire to secure by Letters Patent of the United States, is:

1. The combination with a brake valve device for controlling the application and release of fluid pressure brakes on a car, of means controlled by said brake valve device for controlling the fluid pressure to operate a mechanism for a predetermined length of time to apply sand to the tracks and at the end of said predetermined length of time to operate a mechanism to open the car doors.

2. The combination with a brake valve device for controlling the fluid pressure operated brakes of a car, of means associated with the brake valve device for controlling fluid pressure to first operate a mechanism to apply sand to the tracks when the brakes are applied and then to operate a mechanism to open the car doors.

3. In a fluid pressure brake, the combination with an emergency valve device operating upon a sudden reduction in fluid pressure for effecting an emergency application of the brakes, of means associated with said emergency valve device for controlling a sand applying mechanism and a door operating mechanism, said means being operative upon movement of the emergency valve device to emergency position to first effect the operation of the sand applying mechanism to apply sand to the tracks and then to operate said door operating mechanism to open the doors of the car.

4. In a fluid pressure brake, the combination with an emergency valve device operating upon a sudden reduction in fluid pressure for effecting an emergency application of the brakes, of means associated with said emergency valve device for controlling a sand applying mechanism and a door operating mechanism, said means being operative upon movement of the emergency valve device to emergency position to first effect the operation of the sand applying mechanism for a predetermined length of time and then at the end of said predetermined length of time to operate said door operating mechanism to open the doors of the car.

5. In a fluid pressure brake, the combination with a sand applying mechanism, a door operating mechanism and an emergency valve device operating upon a sudden reduction in fluid pressure for effecting an emergency application of the brakes, of means operative upon movement of the emergency valve to emergency position to effect the operation of the sand applying mechanism, said means being also operative after said emergency valve has been in its emergency position for a predetermined length of time to effect the operation of the door operating mechanism.

In witness whereof, I have hereunto set my hand this 26 day of August, 1918.

GEORGE MACLOSKIE.

Copies of this patent may be obtained for five cents each, by addressing the "Commissioner of Patents, Washington, D. C."